United States Patent [19]

Castelaz

[11] Patent Number: 5,404,561
[45] Date of Patent: Apr. 4, 1995

[54] CLUSTERING AND ASSOCIATE PROCESSOR

[75] Inventor: Patrick E. Castelaz, Yorba Linda, Calif.

[73] Assignee: Hughes Aircraft Company, Los Angeles, Calif.

[21] Appl. No.: 88,634

[22] Filed: Jul. 6, 1993

Related U.S. Application Data

[63] Continuation of Ser. No. 936,716, Aug. 31, 1992, abandoned, and Ser. No. 340,343, Apr. 19, 1989, abandoned.

[51] Int. Cl.$^6$ .................. G06F 15/336; G06F 15/347
[52] U.S. Cl. ............................. 395/800; 364/931.02; 364/932.8
[58] Field of Search ................ 395/650, 700, 800

[56] References Cited

U.S. PATENT DOCUMENTS

| | | | |
|---|---|---|---|
| 4,547,882 | 10/1985 | Tanner | 371/38 |
| 4,719,584 | 11/1988 | Rue et al. | 364/518 |
| 4,760,525 | 7/1988 | Webb | 364/200 |
| 4,783,738 | 11/1988 | Li et al. | 364/200 |
| 4,811,210 | 3/1989 | McAulay | 364/200 |
| 4,918,622 | 4/1990 | Granger et al. | 364/518 |
| 4,930,099 | 5/1990 | Castelaz | 364/820 |
| 5,206,916 | 4/1993 | Castelaz | 382/14 |

OTHER PUBLICATIONS

Kirkpatrick, et al., "Optimization by Simulated Annealing", Science May 1983, vol. 220, No. 4598, pp. 671–680.

Patent application "Wavefront Vector Correlation Processor" Ser. No. 07/255,053 Atty. Docket No. PD-86235.

Primary Examiner—Kevin A. Kriess
Assistant Examiner—John Q. Chavis
Attorney, Agent, or Firm—W. K. Denson-Low

[57] ABSTRACT

A clustering and assignment processor (40) for correlating set (12) of two-dimensional data points (14). Clustering is performed by treating each data point (14) as a mass subject to gravitational attraction by other data points (14). The data points (14) are permitted to move in data space until all data points (14) in particular regions (16) of the data set (12) fall into a single point, or centroid (18). Individual data points (14) and correlated regions (16) of successive data sets (12) are then correlated by means of a resonant descent technique, which determines the distance and direction of individual data points (14) from a chosen data point (108). The processor (40) then matches a pair of two data points (12) with the chosen data point (108) which are equidistant and collinear with the chosen data point (108).

15 Claims, 7 Drawing Sheets

CLUSTERING AND ASSOCIATE PROCESSOR

The Government has rights to this invention pursuant to Contract No. DASG60-87-C-0122 awarded by the Department of the Army.

This is a continuation of application Ser. No. 07/936,716, filed Aug. 31, 1992. This is also continuation of application Ser. No. 340,343, filed Apr. 19, 1989, both abandoned.

BACKGROUND OF THE INVENTION

1. Technical Field

This invention relates to information processors, and more particularly to a clustering and association processor for correlating multiple sets of two dimensional data.

2. Discussion

Assignment and correlation problems are among the most difficult to solve using conventional information processors. Assignment problems include those in which a number of entities are to be selected from among many and assigned to other entities in such a way as to force the entire assignment over all entities to be optimal in some sense. In correlation problems, entities in one set of data are correlated with entities in another set of data. These problems are difficult to solve because they are not generally solvable with a single solution but, instead, there may be range of solutions of which the best solution is sought. Moreover, these problems frequently involve a combinatorial explosion, or exponential blowup, in the number of possible answers. Examples of assignment and correlation problems include, among others, resource allocation, object association, two-dimensional position-only track initiation, deghosting for angle only targets detected by multiple sensors, pattern matching of two-dimensional feature vectors, template matching, two-dimensional filtering, computerized tomography, manufacturing inspection vision systems and medical image diagnosis systems.

Previous approaches in this area have emphasized solutions in software on both general purpose and special purpose (vector, array, systolic, etc.) computers. The disadvantage of a software approach is that it requires explicit algorithm and software development and massive computational power. In addition, software solutions are not feasible for application to real-time or near real-time problems. For example, for two-dimensional position-only track initiation problems, estimates for conventional approaches indicate that for a scenario of N objects detected by a sensor, the best conventional algorithms would require on the order of N squared operations. For example, including minimum estimates for memory access and other overhead, with N equal to 100,000, about $10^{11}$ operations per scan would be required. For a ten second scan this equates to 10 billion operations per second, well beyond the realm of conventional solutions.

Another approach to solving these problems is a technique called simulated annealing. See S. Kirkpatrick, Glatt, and Vecchi: "Optimization By Simulated Annealing", 220 Science, p. 671–680 (1983). However, while algorithms using this approach have been developed, to the applicant's knowledge, an actual working architecture has not been implemented. Also, in the image processing domain, systolic and single-planar correlation processors may exist, but are usually limited to in-plane interconnect structures with fixed templates or two-dimensional filtering structures.

One approach to solving assignment problems is to cluster the data into manageable segments. This makes the task of assigning or correlating easier. However, previous approaches to clustering emphasize solutions in software which present the same disadvantages as with solving assignment correlation problems; in particular, the extensive algorithm and software development and slow processing speeds for large amounts of data.

Thus it would be desirable to provide an information processor that can solve clustering and association problems in real time. It would be further desirable to provide a processor capable of solving these problems without extensive algorithm and software development. Also it would be desirable to provide such a processor which can be easily implemented in hardware, while requiring minimum size weight and power.

SUMMARY OF THE INVENTION

In accordance with the teachings of the present invention, an information processor is provided capable of solving clustering and assignment or correlation problems of realistic sizes in real time on sets of two-dimensional data. The processor incorporates massive parallelism and an interconnected "architecture equals algorithm" design to avoid extensive software development. According to the present invention, to perform clustering, data points in a given set are each assigned to individual processing cells having addresses that correspond to the position of that data point in data space. The data points are treated like individual points of mass and are moved within the processor in a manner that simulates gravitational attraction among the data points.

In particular, a sum of the "attractive forces" between the points is calculated for each data point. In this calculation points that are close to each other are attracted to each other more strongly than are more distant points. This sum yields a movement vector, which determines the direction of movement of each point. After a series of such moves, groups of the data points in a given region will coalesce into various centroids. These centroids are analogous to local "centers of mass" for the various regions in the data space. Since each processing cell carries some identification such as the starting address of the data points which it contains, the original addresses of all the data points in the centroid is known. In this way, each data point in a given region is associated, or clustered, with all other data points that gravitate to a common centroid.

In accordance with the present invention, data points that have been clustered in the above described manner are then associated with corresponding data points in previous and successive sets of data. This is done by transmitting a pulse from a chosen processing cell having a data point to all other processing cells containing data points that are in the same clustered regions as the chosen cell. The pulse is reflected by all the processing cells to which it is sent. The chosen processing cell then receives the reflected pulses and determines if any reflected pulses received from any two processing cells lying in previous and subsequent data sets are coming from processing cells that are equidistant and collinear with the chosen cell. If they are, the chosen cell and the two collinear and equidistant cells are associated with each other by the processor. The processor can then operate on different processing cells in the same set and region as the chosen cell until all the processing cells in the clustered region and all three sets of data have been associated. Next, the processor can proceed to other regions in like manner until all data points in all regions have been associated with data points in the previous and subsequent data sets.

DESCRIPTION OF THE DRAWINGS

The various advantages of the present invention will become apparent to those skilled in the art after reading the following specification and by reference to the drawings in which:

FIG. 6 is a diagram of the interconnection scheme for assigning data points in three successive sets of data;

FIG. 8 is a diagram of the system components for associating individual data points.

DESCRIPTION OF THE PREFERRED EMBODIMENTS

In accordance with the teachings of the present invention, a method and apparatus is provided for clustering and associating two-dimensional data. The processing permits clustering of data within a single set of data points as well as association of individual data points with other data points in successive sets of data. The data may comprise successive sets of two-dimensional data from various domains. For example, the data may comprise two-dimensional data vectors representing object reports or feature vectors from sensors. It is an important feature of this invention that large amounts of data can be processed rapidly. Thus the present invention is capable of handling, for example, 100,000 individual data points in some applications. Further, clustering makes the task of assigning such large amounts of data easier by breaking it up into more manageable sized regions. In this way, clustering performs a kind of pre-correlating for the assigning operation.

Figure 1:
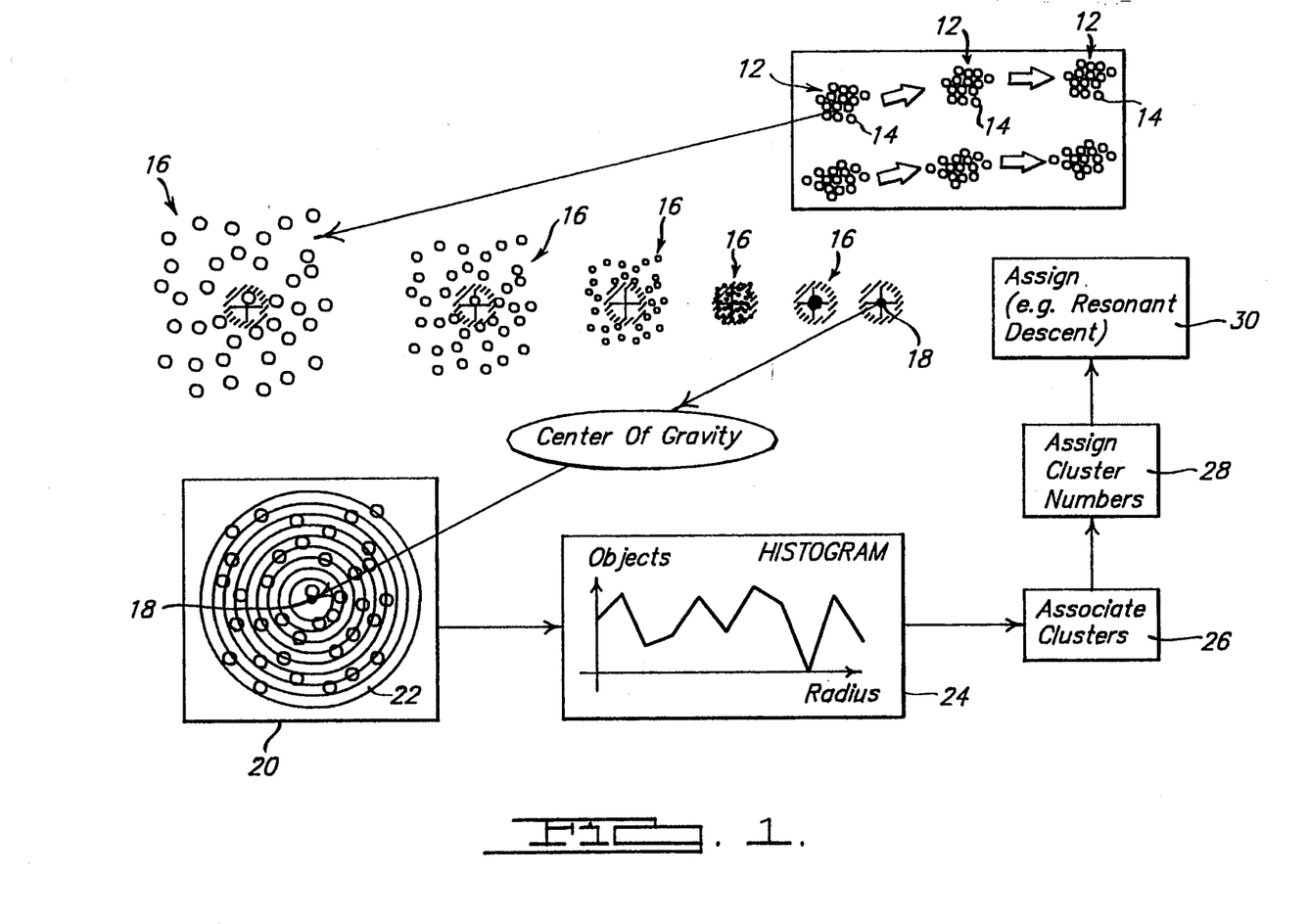
FIG. 1 is a diagram of the processing steps of the present invention.

In FIG. 1 the overall conceptual processing scheme of the present invention is shown. One or more successive data sets 12 are shown each comprising individual two-dimensional data points 14. The successive data sets 12 may be temporally successive (separated by fixed periods of time) or may represent data after some other factor besides time has introduced changes in the data. It is assumed that the successive sets of data are not identical and that changes or movement of data points in data space from one set to another may involve linear or non-linear functions, but not discontinuous functions.

In accordance with the present invention, to perform clustering within a data set 12, the individual data points 14 may be thought of as objects having mass and a gravitational attraction on the other data points 14. The attractive force may, for example, vary with the square of the distance between the data points 14. While the inverse square gravitational law may be used to model this process, other models may also be employed such as $1/r$, $1/r^3$, etc., where r is the distance between the two objects. The gravitational rule for the attractive force will determine how rapidly the attractive force decreases as distance between the two points 14 increases. The optimum gravitational law will depend on a number of factors such as the nature of the data, the manner in which the data points 14 are distributed, the desired speed of the processing, etc.

Whatever the attractive force law chosen, under this force the data points will be permitted to "move". Any given point 14 will be pulled in a number of directions by the points 14 surrounding it. By calculating the vector sum of all the attractive forces, a net movement vector can be calculated for each data point 14. This movement vector will define a direction of movement for each point 14 which generally represents the direction in which the greatest number of data points 14 in a localized region lie. In general, this movement by the data points 14 will cause the entire set 12 to break up into a number of regions. Each of these regions can be considered to be a portion of the set 12 where the data already had some characteristic grouping. However, the pre-existing grouping is subtle and ill defined. By permitting the attractive force processing to operate, these regions separate and reveal themselves.

To illustrate clustering by attractive forces, one region 16 of the set 12 is shown in FIG. 1. It should be noted that the region 16 is but one expanded view of the set 12 and that other regions in set 12 exist but are not shown. It is also important to note that the boundaries of region 16 cannot be determined until the clustering process is complete and that region 16 is shown separated out of set 12 for illustrative purposes only.

Five successive views of the region 16 are shown in FIG. 1, as the attractive force is permitted to move the data points 14. Eventually, all the points 14 in a region 16 will be attracted to a single center of mass or centroid 18. Once the location of the centroid 18 is determined, it is useful to reconstruct the original position of data points 14 in the region 16. The distance of each point 14 from the centroid 18 can then be determined. For example, as shown pictorially in graph 20 in box 20, by drawing concentric rings around the centroid, 18 one can determine which radius band each data point 14 lies in. Also, one can construct a histogram 24 showing the number of data points 14 in each radius band 22. The histogram 24 reveals a distribution pattern of points 14 around the centroid which is a characteristic signature of that region 16 in the set 12. This histogram can then be used to associate given region 16 in successive sets of data 12 by comparing the pattern in the respective histograms 24. See box 26. Alternatively, it may also be possible to associate regions 16 in successive sets of data 12 simply by associating those regions having centroids 18 which lie closest to each other in the data space. The region 16 may then be assigned region, or cluster numbers which associate them with regions, or clusters, in other sets 12, as shown in box 28.

Once centroids in successive sets 12 are found and the centroids 18 in each set 12 have been associated with centroids 18 in the other sets 12, the clustering of the data is complete. It may then be desirable to assign each point 14 to other points 14 in successive sets 12. This may be accomplished, in accordance with the present invention, as shown in box 30, by means of resonant descent, as will be discussed in more detail below. It is important to note that since the points 14 have already been clustered into regions 16, the task of assigning data points 14 need only be performed on a region by region basis. This greatly improves the process of assigning data points 14. After the resonant descent processing is complete, each data point 14 in each successive data set 12 is assigned to another data point 14. The clustering and assignment processing is then complete. It will be appreciated that once the assignment is complete further processing may be employed to utilize the assignment depending on the particular application.

Figure 2:
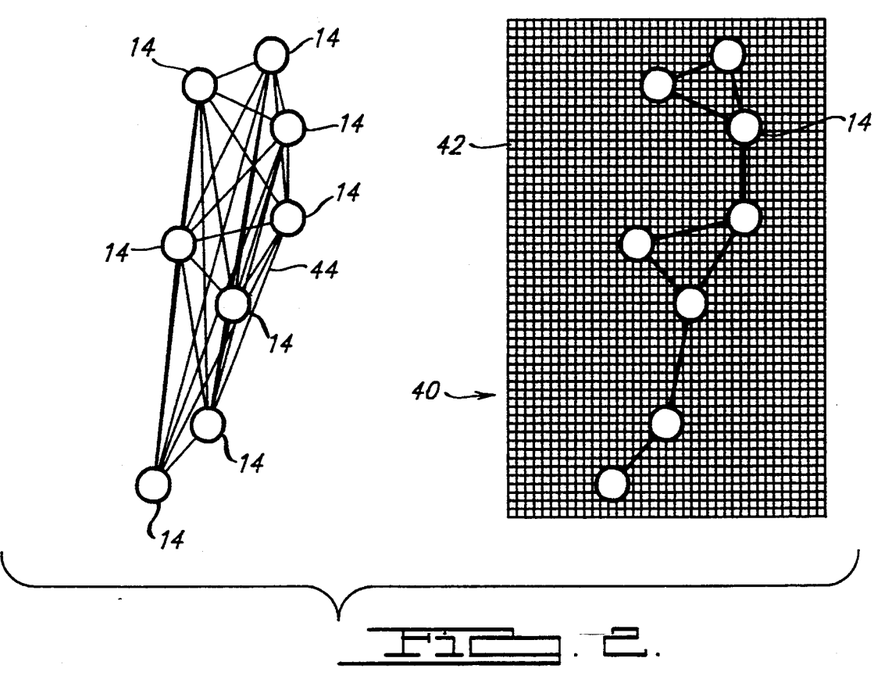
FIG. 2 is a diagram of the interconnection scheme for clustering in accordance with the present invention.
Figure 3:
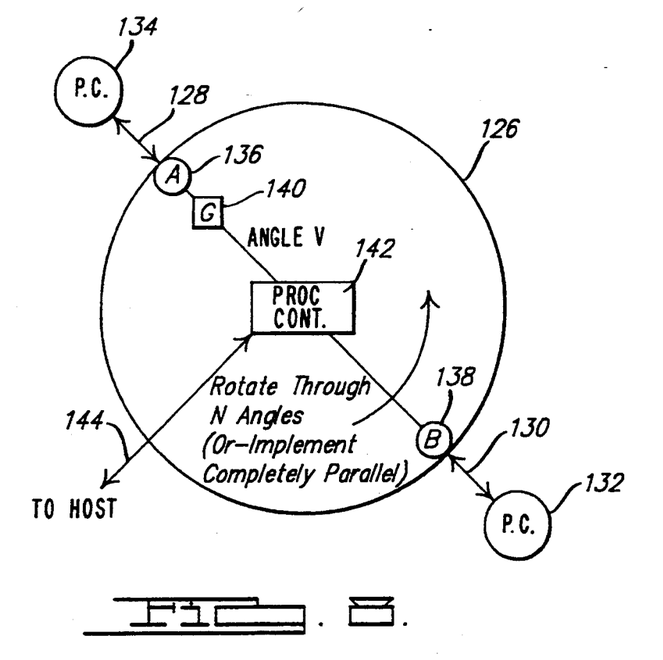
FIG. 3 is a drawing showing various steps of the clustering process in accordance with the present invention.
Figure 4:
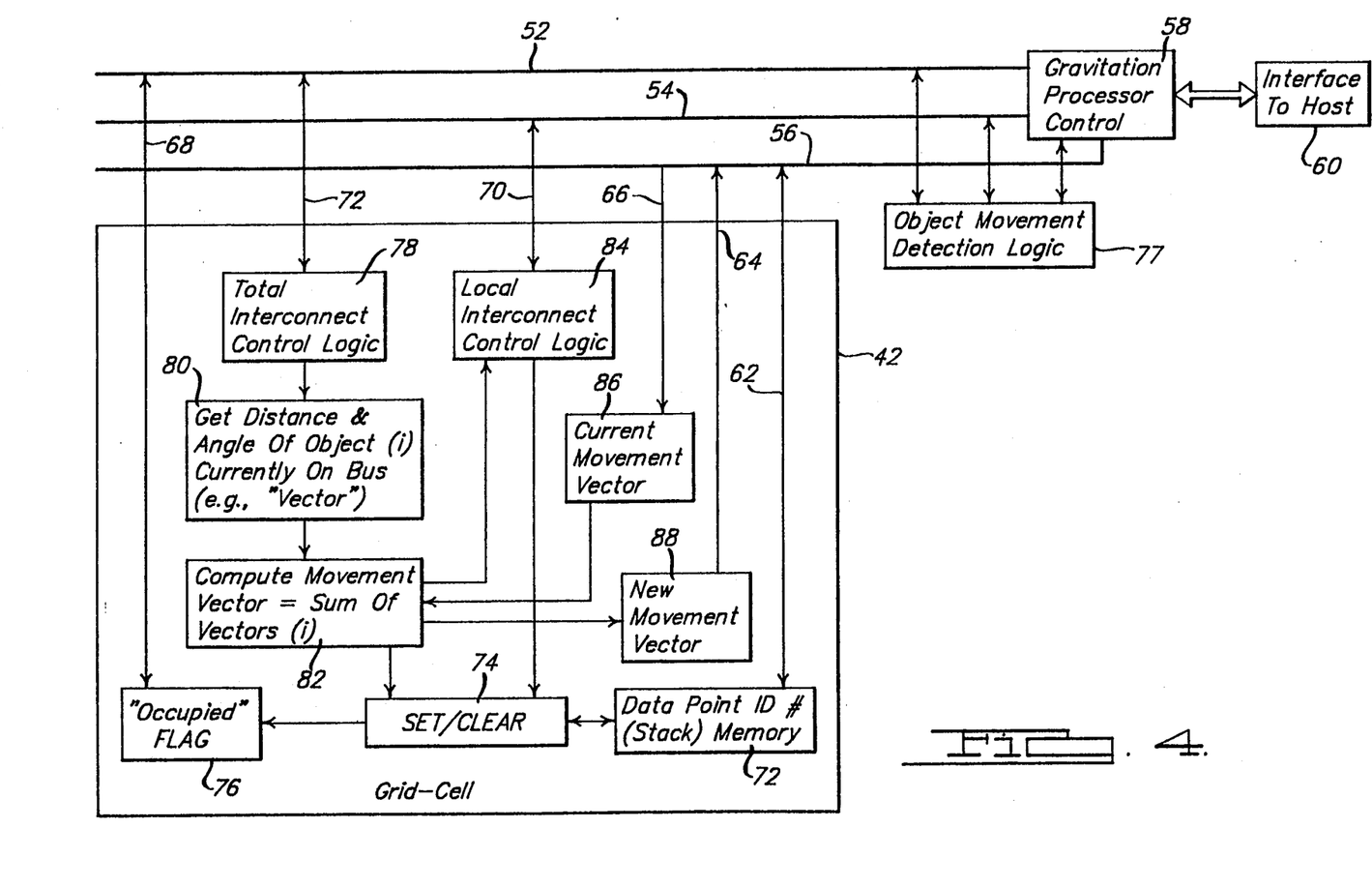
FIG. 4 is a diagram of the processor architecture for clustering utilizing a bus architecture.

In order to implement the processing concepts as shown in FIG. 1, the preferred embodiment of the clustering process will be shown in FIGS. 2–4 and of the assignment processing employing resonant descent, in FIGS. 5–8.

Referring now to FIG. 2, in accordance with the present invention, there is shown a group of data points 14 from a given region 16 of set 12. In order to perform the clustering utilizing attractive forces, as described in connection with FIG. 1, a clustering and assignment processor 40, in accordance with the present invention, assigns each data point 14 to a processing cell 42. Each processing cell 42 has an address, and all possible addresses comprise the data space of all possible data points 14 in the two-dimensional data set 12. Each processing cell 42 is capable of receiving a signal and indicating whether or not a data point 14 is present at that address. It is also capable of transferring a representation of that data point 14 to other processing cells 42. (It should be noted that the data points 14 are enlarged for illustration purposes only in FIG. 2, and that actually only one processing cell 42 is occupied by each data point 14.) In order to determine a movement vector for each point 14, the distance and location of all other points 14 must be known. This may be accomplished by interconnecting every point 14 with every other point 14 in a given set 12. The total interconnection lines 44 are shown in FIG. 2. These interconnections may be realized, for example, by interconnections between the processing cells 42. In particular, there may be direct communication between these processing cells 42 or the connection may be by means of a data bus.

Referring now to FIG. 3, a simplified data set 12 consisting of 6 points 14 is shown. One portion of the clustering and assignment processor 40 is shown having a grid of interconnecting processing cells 42. In the initial state for each point 14 a movement vector is calculated that is based on the sum of the attractive forces acting on that point 14. The movement vector is some function of the distance and direction of all neighboring points 14.

In cycle one the points 14 have all moved a given amount and direction, determined by the movement vector. In order to simplify and speed up the calculation of the movement vector, distances which exceed a given threshold distance can be ignored. This is shown in the reduced interconnection scheme 46 for cycle one. In the reduced interconnection scheme 46 it can be seen that all interconnections that exceed the distance between points 48 and points 50 have been eliminated. The exact magnitude of the threshold may vary depending on the nature of the problem and the data itself. Also, the threshold may be introduced at some intermediate stage rather than at the beginning, or not at all. Another effect of the threshold will be to minimize motion of the centroids toward each other.

In cycle two the points 14 have been allowed to move even closer to each other, and the number of interconnections reduced further. In cycle three the points 14 have all moved into two of the processing cells 42. At this point, since the distance between these points exceeds the distance threshold, and since all points within the threshold now occupy the same processing cell, there will be no further movement of data points 14. The two points are designated as centroids 18. It is important that the processing cell 42 has sufficient memory so that it is capable of storing the original address location, or identification number, of each point 14 that it contains. In this way, the original address (and hence the identification) of each point 14 in a given region 16 to which the centroid 18 belongs can be identified.

A portion of the architecture of the clustering and assignment processor 40 in the preferred embodiment is shown in FIG. 4. FIG. 4 illustrates a bus architecture for interconnecting and moving data. It will be appreciated that in this embodiment, the processing cell 42 need not be arranged in a two-dimensional grid as shown in FIGS. 2 and 3, but instead are strung along the bus structure. It will be appreciated that the bus structure is but one means of implementing the desired processing, and that other processes, such as the use of a two-dimensional grid of interconnected processing cells 42 may be employed. FIG. 4 shows a gravitational process controller 58 which transmits an I.D. No. for each data point 14 to the appropriate processing cell 42 along the total interconnect bus 52. The information is then transferred from the data bus 56 through line 62 into the processing cell 42 where it is stored in the data point I.D. No. memory. This data point I.D. No. memory 72 can hold a large number of identification numbers. This is necessary since the centroid must hold all the identification numbers for all points in a region 18. In addition, when a data point enters the processing cell 42 the "occupied" flag 76 is set by the "set/clear" control 74 indicating that a data point 14 is currently in the cell.

Once all data points 14 have been loaded into the appropriate processing cell 42, each occupied cell 42 is connected to every other occupied cell 42 by means of the total-interconnect control logic 78 and the total-interconnect bus 52. That is, all occupied processing cells 42 are placed on the total interconnect bus 52. By means of this interconnection, the processing cell 42 then can obtain the location of each occupied processing cell 42 and then determine the distance and angle (direction from that processing cell 42 to another occupied processing cell 42 in data space) of each occupied cell in the data space. This is accomplished in box 80. The distance and angle vectors are then added together, box 82, to derive a movement vector that is the resultant vector sum of cells of the attractive forces exerted on the processing cell by all the other connected processing cells 42. It will be appreciated that the movement vector can be calculated in the same way as the resultant gravitational force on a mass body in physics. The only distinction here is that the magnitude of the resulting vector is not necessarily used immediately, although it could be. The primary use for the movement vector is to determine the direction of resulting force, and not the magnitude of the resulting force. The degree to which the distance of occupied cells influence the resultant movement vector will be determined by the gravitational law chosen. It has been found that the conventional inverse square law works well in some applications.

The movement vector is then calculated in the above described manner for all occupied cells 42. Next, the local interconnect control logic 84 moves the data points I.D. No. and the new movement vector 88 along the local interconnect bus 54 to the neighboring cell lying along the direction identified by the movement vector. The new movement vector 88 then becomes the current movement vector 86 in the new processing cell 42. It should be noted that this movement may ordinarily be to one of the eight processing cells 42 immediately adjacent to the processing cell 42 in data space. In this case, the cell most closely approximating the proper direction is chosen. It is possible, however, to have the movement occur in larger steps, that is, to skip adjacent cells, thereby permitting movement that more accurately reflects the precise angle of movement dictated by the movement vector. Also, when the data point 14 is moved from a cell the local interconnect control logic 84 will clear the occupied flag 76 by means of the set/-clear circuit 74 in the vacated processing cell 42. Also, the local interconnect logic 84 in the new processing cell 42 will set the occupied flag 76 for that cell. If the new processing cell 42 contains more than one data point 14, the new processing cell data point I.D. No. memory 72 stores all the data point I.D. Nos.

Next, the above process is repeated. That is, each occupied cell obtains the position of all other occupied cells, the movement vectors are computed and all the processing cells 42 move data points 14 by transferring their information to the occupied neighboring processing cells. At any point in this process, a threshold can be introduced to the movement vector computation 82 which will result in the elimination from the calculation any processing cells 42 that are at a distance exceeding the threshold. The movement of data points 14 proceeds until all the data points within a given region 16 lie in a single processing cell 42, which is the centroid 18 for that region.

The object movement detection logic 77 performs the function of detecting cessation of all data movement activity—e.g., no more data movement is taking place.

After the movement stops, the location address of the centroids is sent to the host CPU. Also, the data point I.D. Nos. from the memory 72 within each centroid 18 processing cell 42 is sent to the host CPU.

In general, it will be desirable to perform the above clustering process on a succession of sets 12 of data. In this way, a particular region 16 in a data set 12 can be associated with other like regions 16 in a successive set 12. This may be accomplished by simply associating the centroids 18 in one set 12 which lie closest in the data space to centroids 18 in the neighboring data sets 12. Or, one may construct a histogram 24 as shown in FIG. 1 and compare the pattern or signature with those in succeeding data sets 12. This comparison of histograms can be performed using conventional techniques such as template matching.

Once the centroids have been associated, the clustered data can be utilized in a number of ways depending on the particular application.

In most processing tasks it will be desirable to assign the individual data points 14 in one set 12 to those in successive data sets. In accordance with the preferred embodiment of the present invention, data points 14 are assigned by means of the processing technique shown in FIGS. 5 through 8.

Figure 5:
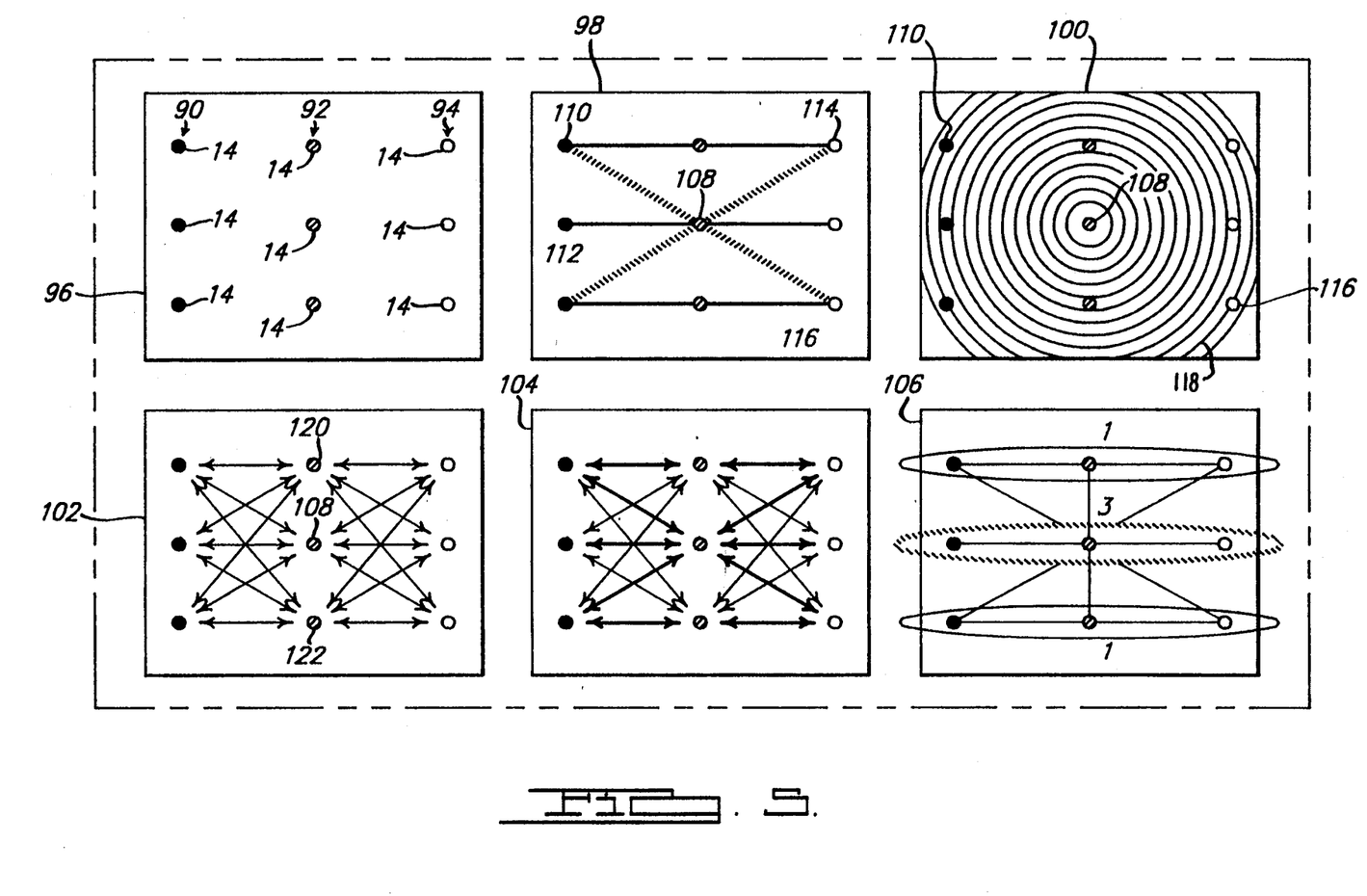
FIG. 5 is a conceptual diagram of the present invention for assigning data points to other data points.

Referring now to FIG. 5, a simplified representation of the resonant descent processing technique in accordance with the preferred embodiment is shown. Data points 14 from three separate data sets 90, 92 and 94 respectively, are shown. In the preferred embodiment the clustering and assignment processor 40 operates on clustered data from only one associated region 16 in the three data sets 90, 92 and 94. The basic techniques for assignment of individual data points 14 employed by the clustering and assignment processor 40 is called resonant descent. FIG. 5 illustrates the conceptual framework of resonant descent. In box 96, three successive sets of data 90, 92 and 94 from a region 16 are shown, with only three data points 14 included, for the sake of illustration. Each data point 14, occupies a processing cell such as the one shown in FIGS. 2–4. The clustering and assignment processor 40 operates on a particular chosen processing cell 108 in the middle set 92 and locates one processing cell in the previous set 90 and one in the subsequent set 94 to associate with the chosen processing cell 108.

To accomplish this association the processing cell 108 may first transmit a pulse in all directions. Neighboring processing cells not belonging to set 12 can then reflect this pulse back to the chosen cell 108. By analyzing the timing of the returning pulses and direction of the returning pulses, it will be seen that some returning pulses will occur at about the same time. If two simultaneously returning pulses originate at processing cells that lie along a straight line through a chosen cell 108, one may consider those data points 14 to be associated with each other. For example, processing cells 110 and 116 are collinear with the chosen cell 108. As shown in box 100, processing cells 110 and 116 also are the same distance from the chosen cell 108, since they lie along the same radius 118. It can be assumed for most cases that processing cells that are the same distance from the chosen cell, and are also collinear with the chosen cell are, in effect, representations of the same point. For example processing cell 110, 108 and 116 may represent the location of a single object at three different times, assuming that the object, within the time frame of the three succeeding sets 90, 92 and 94 follows a path that is roughly linear.

In box 102 there is shown a representation of the signal path for the transmitted and reflected pulses for three processing cells 120, 108 and 122. In accordance with tile present invention, to distinguish the simultaneous received pulses from the other processing cells the transmission of the pulses can be amplified if they fall within a predetermined range. After successive cycles of transmission and amplification, certain paths will be amplified to a certain "resonance" level. The processing cells along this resonant path are then associated with the chosen processing cell 108. Box 104 illustrates the strengthening of certain paths (dark arrows) and box 106 illustrates one path that has reached resonance.

Figure 7:
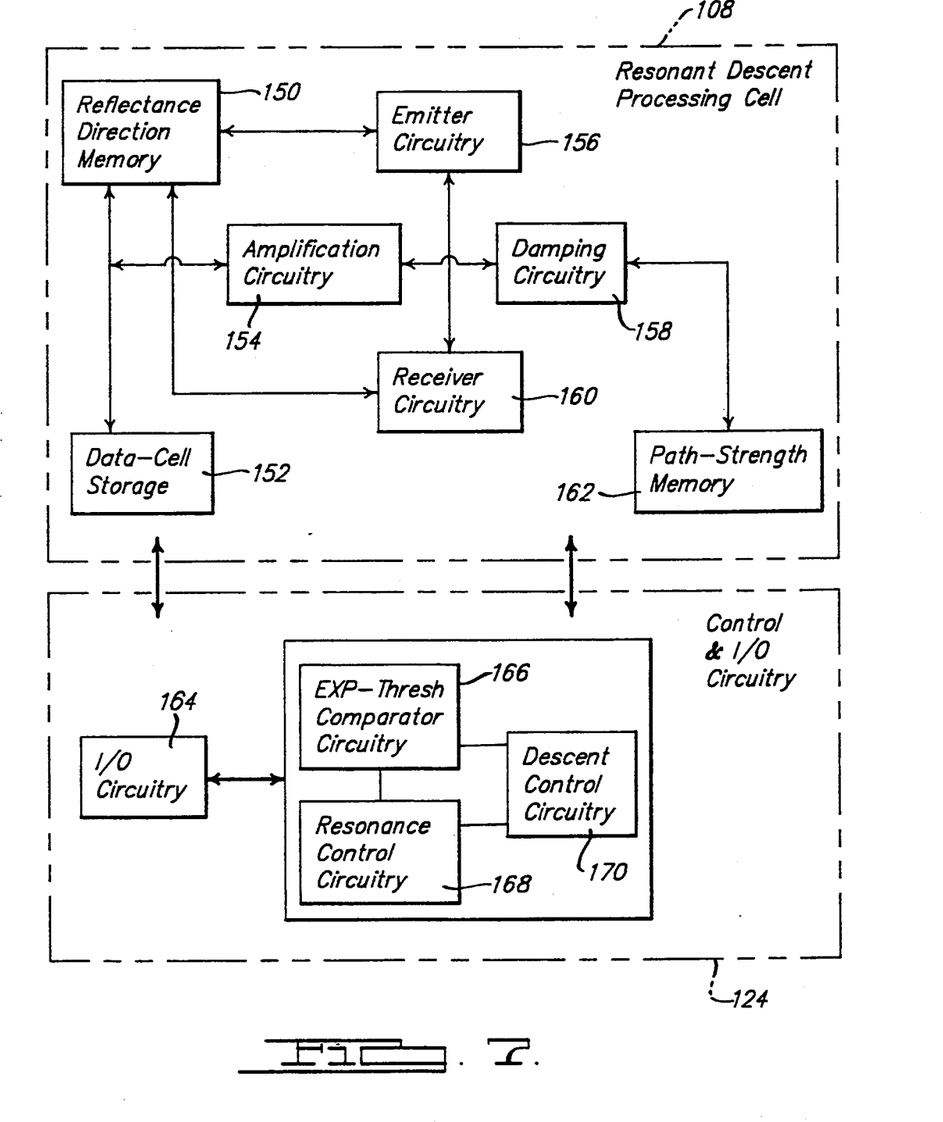
FIG. 7 is a diagram of system components for carrying out the teachings of the present invention.
Figure 11:
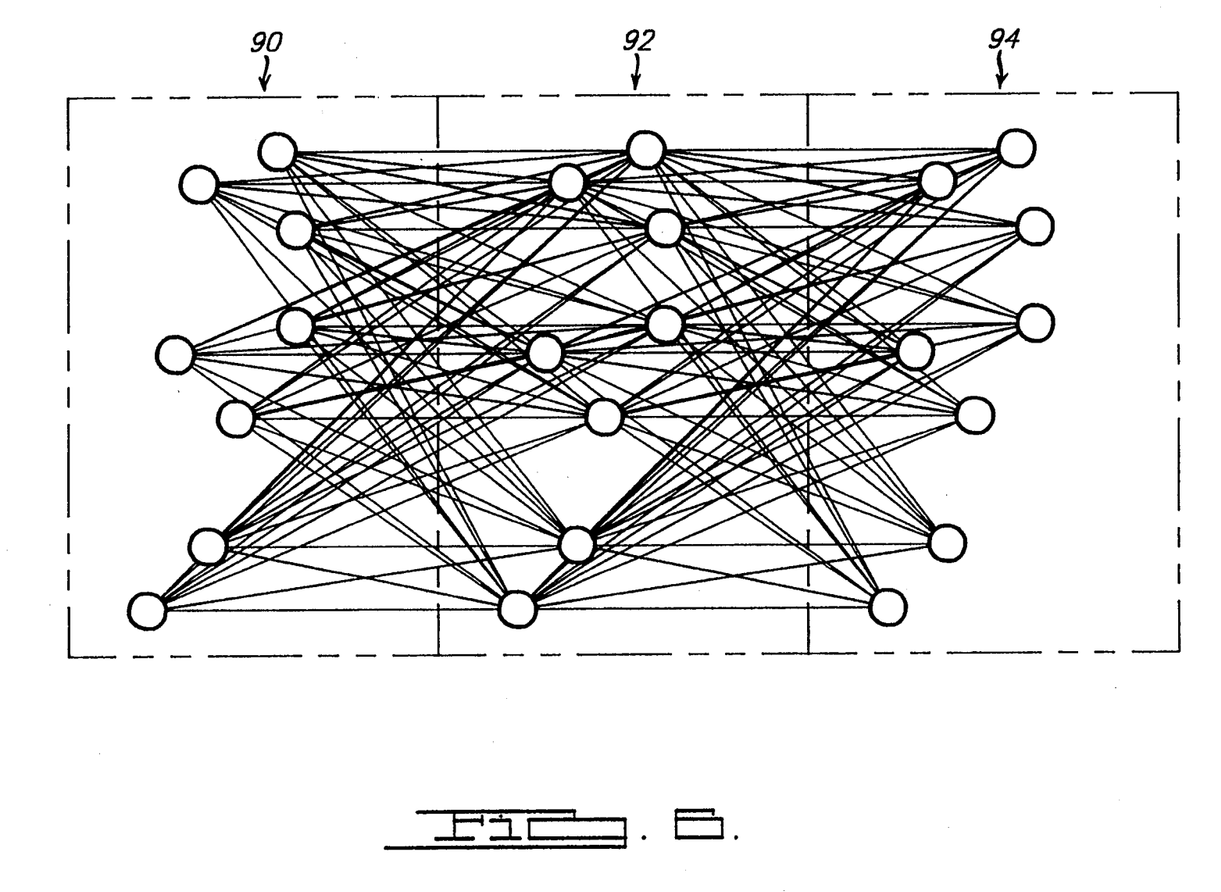

In order to implement the resonant descent processing concept in hardware, one approach is to connect all processing cells 108 in the three successive sets with each other as illustrated in FIG. 6. Pulses from the chosen cell as well as reflected pulses can then be transmitted along these connective paths. FIG. 7 illustrates the components of each processing cell 108 as well as the control and IO circuitry 124 for carrying out the required functions to perform the resonant descent processing in this manner. The chosen processing cell 108 utilizes a reflectance direction memory 150, a data cell storage memory 152, amplification circuitry 154, emitter circuitry 156, receiver circuitry 160, damping circuitry 158, and path strength memory 162. Also shown in FIG. 7 is the control and IO circuitry including IO circuitry 164, EXP threshold comparator circuitry 166, resonance control circuitry 168 and descent control circuitry 170.

In accordance with the preferred embodiment, rather than having a hard wired connection between each processing cell 108 as shown in FIGS. 6 and 7, the processing cell may transmit an electromagnetic or acoustic signal to the neighboring processing cells as illustrated in FIG. 8. Each radiating processing cell 126 is capable of transmitting an electromagnetic or acoustic signal (for example, RF, optical, etc.). The transmission may occur along two narrowly defined angular directions, 180° apart along transmission paths 128 and 130, when the processing cell 126 is the chosen cell 108 shown in FIG. 5. Every processing cell such as 132 and 134 is also capable of reflecting a pulse back toward its source when those processing cells 132 and 134 are not the chosen cell. The two processing cells 132 and 134 in FIG. 8 are shown as reflecting the pulses received.

The strength of the transmission of each pulse by the processing cell 126 is controlled by the adjustable gain amplifying device 136 having an amplitude A, and amplifying device 138 having an amplitude B which are controlled by means of the gain adjust circuit 140. A processing cell control circuit 142 is used to rotate the path of transmission through a succession of angular positions. Alternatively, radiation in all directions at once is possible by incorporating transmission and detecting means in all desired angular positions; in such a case, a rotating control circuit 142 would not be necessary. In the preferred embodiment, the resonant descent processing is done for one angular position at a time.

Before the chosen cell 126 transmits a pulse, the data points from one associated cluster in a sequence of three sets of data are transmitted into identical processing cells 126. The processing cells 126 are arranged in physical locations which approximate their locations in data space as illustrated in FIG. 5. With reference now to box 96, in FIG. 5, in accordance with the preferred embodiment, the processing cells 126 are arranged so that processing cells 126 in a previous set 90, the chosen set 92 and the following set 94 are along a planes that are adjacent and coplaner. It is also important that three planes of processing cells be arranged so that the corresponding addresses of three sets of data 90, 92 and 94 are adjacent to each other in the three planes. Referring now to FIG. 8 the processing cells 126 are loaded with the appropriate data points 14 by means of an interface line 144 connected to the host CPU (not shown). The interface line 144 also permits the processing control circuit 142 to be controlled by the host CPU.

The basic processing steps for assigning data points 14 in accordance with the preferred embodiment are shown in Table I below. In step 1, the amplifier devices 136 and 138 are set to some initial chosen value, or gain, resulting in path amplitudes A and B respectively. In step 2 the processing cell 126 transmits a pulse through amplifiers 136 and 138 along paths 128 and 130 with the processing cell controller 142 set to a particular angle V. This pulse is reflected by the processing cells 132 and 134 in the previous and subsequent data sets. In steps 3 and 4 the reflected pulses are received by the chosen processing cell 126 along the same path it was transmitted, i.e., through paths A and B. The pulse is received through path 128 at a time defined as T1 and the pulse through path 130 is received at a time defined as T2. In step 5, the gain adjust circuit 140 determines if the absolute value of the difference in time between the two received pulses, or T2 minus T1, is less than some threshold "th". If it is, then new path strengths are calculated which increase the path strength. K may be some function of T2 minus T1 or it may be a constant. Where K is a function of (T2−T1) it is desired to make it a function of 1/(T2−T1), thereby resulting in a greater increase in path strength for cases where the time difference is least. The path amplitude A and. B are adjusted by having the gain adjust circuit 140 change the gain in the two amplifiers 136 and 138.

If instead T2 minus T1 is not less than the threshold, then K is set to be less than one and the path strength is decreased. In this way, the path strength is strengthened to processing cells which lie along the same distance from the chosen cell and is weakened for processing cells which do not. In step 6, if the new amplitudes A and B are greater than a threshold times the previous amplitude, then the gain adjust controller 140 records the angle on which the processing cell 126 is transmitting, as well as the distances D1 and D3 from processing cell 126 at which reflected processing cells 132 and 134 occur. (D1 and D3 may be calculated from the time T1 and T2). This information will permit the host CPU to determine the identity of the two processing cells 132 and 134 and associate these data points with the data points in the chosen processing cell 126. The two processing cells 132 and 134 are then disabled from reflecting. The processing then proceeds from step 6 to step 7.

However, in step 6, if A (new) and B (new) are less than the threshold times the previous amplitude, then the processor 40 determines if A (new) is greater than A(min.), and B(new) is greater than B(min.); if so, then steps 2 through 6 are repeated. If not, the processor 40 goes to step 7.

In step 7, steps 2 through 6 are repeated for all appropriate angles V. This will result in a single path being chosen having the greatest path strength and the chosen cell 108 will be associated with the two reflecting cells yielding the greatest amplitude. This information is then transmitted to the host CPU along path 144.

In step 8, step 2-7 are repeated for all the data points 14 in the middle data set, e.g. 92. All data points will not, however, get assigned. Step 9 then accomplishes an assignment for these "stragglers". In particular, step 2-8 are repreated for these data points 14 with a random number (RND) multiplied by the A(new) and B(new). In addition, the threshold "th"A[V] and "th"B[V] are made to decrease exponentially on each iteration. This will force all the points 14 to eventually be assigned.

TABLE I

Step 1) Init. A, B
Step 2) Xmiton [A,V] & [B,V]
Step 3) Recv on [A,V] at time T1
Step 4) Recv on [B,V] at time T2
Step 5) IF |T2-T1| < thV[V] then
    USING K = fnc (|T2-T1|) or K = Constant:
    A(new) = K*A(old), where K > 1
    B(new) = K*B(old), where K > 1
  ELSE
    A(new) = K*A(old), where K < 1
    B(new) = K*B(old), where K < 1
Step 6) IF A(new) > thA[V] and B(new) > thB[V] then
    Record [V,D1] & [V,D3] for current scan 2 object
    Disable [V,D1] & [V,D3] from reflecting
    GO TO Step (7)
  ELSE TABLE I-continued

```
        If A(new) > A(min) & B(new) > B(min) then
           Repeat Steps (2)–(6)
           ELSE GO TO Step (7)
Step 7) Repeat Steps (2)–(6) for all appropriate
           angles [V]
Step 8) Repeat (2)–(7) for all scan 2 objects
Step 9) Repeat (2)–(8) for "stragglers" - but in step
           (6) use: A(new)*RND > thA[V] & B(new) *RND >
              thB [V],
           where
           RND = Random value, and thA[V] & thB[V]
           decrease exponentially on each iteration
```

In view of the foregoing, those skilled in the art should appreciate that the present invention provides clustering and assignment processor and technique that can be used in a wide variety of applications. The various advantages should become apparent to those skilled in the art after having the benefit of studying the specification, drawings and following claims.

What is claimed is:

1. A system for processing a series of successive arrays of two dimensional data points in a predetermined area of two-dimensional data space comprising:

means for receiving said data points, a plurality of interconnected processing cells, said processing cells having addresses that represent each possible two-dimensional data point in said predetermined area, said processing cells each having a means for storing the original address of all the data points said processing cells contain;

means for interconnecting selected pairs of processing cells containing data points;

means for calculating a movement vector for each data point, the movement vector being a function of the vector sum of vectors indicating the direction and distance of surrounding data points, said movement vector establishing a direction of movement for said data point;

means for transferring each data point in a processing cell to a neighboring processing cell in a direction determined by said movement vector, wherein said movement is repeated for each data point until all data points within a given region of said array occupy a single processing cell, whereby all data points from a given region of each of said successive arrays can be associated with said single processing cell, said processing cells having a means for reflecting received pulses; and means for correlating individual data points in one of said regions of said arrays with individual data points in corresponding regions in previous and subsequent arrays in said series of successive arrays, wherein said means for correlating further comprises a means for transmitting a pulse from a chosen processing cell in said one region to processing cells in corresponding regions in the previous and subsequent cells, said transmitted pulse being reflected by said previous and said subsequent cells, means for sensing when said chosen processing cell receives reflected pulses substantially simultaneously from processing cells lying along a linear path with said chosen processing cell, and means for determining the address of the processing cell which reflected said simultaneous pulses, whereby said processing cells reflecting simultaneous pulses are correlated with each other and with said chosen processing cell.

2. The system of claim 1 wherein said two-dimensional data points represent object reports originating from sensors.

3. The system of claim 1 wherein said means for interconnecting comprises a data bus architecture capable of connecting each processing cell to every other processing cell.

4. The system of claim 1 wherein said processing cells are arranged in a two dimensional spray.

5. The system of claim 1 wherein said means for calculating a movement vector further comprises, a thresholding means for disregarding surrounding data points when the distance of the surrounding data point from said data point is greater than a predetermined threshold.

6. The system of claim 1 wherein said processing cells include a means for reflecting received pulses, and wherein the system further comprises: means for correlating individual data points in one of said regions of said arrays with individual data points in corresponding regions in previous and subsequent arrays in said series of successive arrays, wherein said means for correlating further comprises a means for transmitting a pulse from a chosen processing cell in said one region to processing cells in corresponding regions in the previous and subsequent arrays, said transmitted pulse being reflected by said previous and said subsequent cells, means for sensing when said chosen processing cell receives reflected pulses substantially simultaneously from processing cells lying along a linear path with said chosen processing cell, and means for determining the address of the processing cells which reflected said simultaneous pulses, whereby said processing cells reflecting simultaneous pulses are correlated with each other and with said chosen processing cell.

7. The system of claim 6 wherein said means for transmitting a pulse includes means for directing said pulses in discrete angular directions 180 degrees apart.

8. The system of claim 6 wherein said means for sensing when pulses are received substantially simultaneously further comprises means for comparing the difference in the time said signals are received, with a predetermined threshold, and means for amplifying the transmission of said pulse when said threshold is exceeded.

9. The system of claim 6 wherein said pulse is transmitted along a conductor.

10. The system of claim 6 wherein said pulse is transmitted by means of electromagnetic or acoustic radiation.

11. The system of claim 6 wherein said pulse is transmitted through a data bus structure to selected processing cells.

12. The system of claim 1 further comprising means for measuring the distance of the original location of each data point from said single processing cell, wherein said distances for each data point in a region creates a characteristic histogram, whereby corresponding regions in said successive arrays can be correlated.

13. A method for processing a series of successive arrays of two-dimensional data points in said predetermined area of two dimensional data space, said method comprising:

receiving data points in a plurality of interconnected processing cells, said processing cells having addresses that represent each possible two-dimensional data point in said predetermined area, said processing cells each having a means for storing the original address of all the data points it contains;

interconnecting selected pairs of processing cells containing data points;

calculating a movement vector for each data point, the movement vector being a function of the vector sum of vectors indicating the direction and distance of surrounding data points, said movement vector establishing a direction of movement for said data point; and transferring each data point in a processing cell to a neighboring processing cell in a direction determined by said movement vector, wherein said transfer is repeated for each data point until all data points within a given region of said array occupy a single processing cell, whereby all data points from a given region of each of said successive arrays can be associated with said single processing cell.

14. The method of claim 13 further comprising:

correlating individual data points in one of said regions of said arrays with individual data points in corresponding regions in previous and subsequent arrays in said series of successive arrays, wherein said step of correlating further comprises the steps of transmitting a pulse from a chosen processing cell in said one region to processing cells in corresponding regions in the previous and subsequent cells, reflecting said transmitted pulse by said previous and subsequent cells, sensing when said chosen processing cell receives reflected pulses substantially simultaneously from processing cells lying along a linear path with said chosen processing cells, and determining the address of the processing cell which reflected said simultaneous pulses, whereby said processing cells reflecting simultaneous pulses are correlated with each other and with said chosen processing cell.

15. A system for correlating a multiplicity of two-dimensional data points in a series of successive arrays of said two dimensional data points representing locations of moving targets in a predetermined area of two-dimensional data space for comprising:

means for receiving said data points, a plurality of interconnected processing cells, said processing cells having addresses that each represent one of the possible two-dimensional data points, means for interconnecting selected pairs of processing cells containing data points;

means for repetitively calculating a movement vector for each data point in a processing cell and transferring said data point to a neighboring processing cell located in a direction determined by the movement vector until all data points within a given region of said array occupy a single processing cell, said movement vector based on a gravitational-type rule in which the data points are assumed to have an attractive force related to the distance in the data space between the data points, the movement vector for each data point being a function of the vector sum of the attractive forces of all data points within a predetermined distance in the data space from said data point, and means for correlating individual data points in one of said regions of said arrays with individual data points in corresponding regions in previous and subsequent arrays in said series of successive arrays, wherein said means for correlating further comprises a means for transmitting a pulse from a chosen processing cell in said one region to processing cells in corresponding regions in the previous and subsequent cells, said transmitted pulse being reflected by said previous and said subsequent cells, means for sensing when said chosen processing cell receives reflected pulses substantially simultaneously from processing cells lying along a linear path with said chosen processing cell, and means for determining the address of the processing cell which reflected said simultaneous pulses, whereby said processing cells reflecting simultaneous pulses are correlated with each other and with said chosen processing cell.

* * * * *